United States Patent [19]

Waddill

[11] 4,264,758
[45] Apr. 28, 1981

[54] NOVEL EPOXY CURING SYSTEM

[75] Inventor: Harold G. Waddill, Austin, Tex.

[73] Assignee: Texaco Development Corporation, White Plains, N.Y.

[21] Appl. No.: 90,765

[22] Filed: Nov. 2, 1979

[51] Int. Cl.$^3$ .................... C08G 59/56; C08G 59/62
[52] U.S. Cl. ........................................ 528/100; 528/88; 528/104; 252/182
[58] Field of Search .................... 528/88, 100, 104; 252/182

[56] References Cited

U.S. PATENT DOCUMENTS

| | | | |
|---|---|---|---|
| 3,397,177 | 8/1968 | Stolton | 260/47 |
| 3,639,928 | 2/1972 | Bentley et al. | 260/47 EC |
| 3,740,373 | 6/1973 | Bentley et al. | 260/47 EC |

FOREIGN PATENT DOCUMENTS 929373 6/1963 United Kingdom .

*Primary Examiner*—Earl A. Nielsen
*Attorney, Agent, or Firm*—Carl G. Ries; Robert A. Kulason; Kenneth R. Priem

[57] ABSTRACT

A novel epoxy resin curing system comprises salicylic acid and methyliminobispropylamine (MIBPA). The resins comprise a vicinal polyepoxide and a curing amount of salicylic acid and MIBPA.

7 Claims, No Drawings

NOVEL EPOXY CURING SYSTEM

BACKGROUND OF THE INVENTION

1. Field of the Invention

This invention relates to curable epoxy resins. More particularly, to a novel curing system, salicylic acid and MIBPA.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. Known curing agents are anhydrides and amines. Salicylic acid is known as an accelerator for epoxy resins but not as a co-reactant as here. See Lee and Neville, *Handbook of Epoxy Resins*, p. 11-18 and U.S. Pat. No. 3,639,928.

Prior art epoxy resins are used as coatings, castings and sealants. An important growing application for epoxies is light weight body parts for machinery such as automobiles. This application requires an epoxy part which can withstand the high temperatures of a paint baking oven without undergoing noticeable distortion. Also structural strength is required. My invention is a novel curing system which imparts these properties to epoxies.

SUMMARY OF THE INVENTION

According to the broad aspect of the instant invention, an epoxy resin is cured with a combination of salicylic acid and MIBPA.

In one aspect, a curable epoxy resin composition comprises a vicinal polyepoxide and a curing amount of a combination of salicylic acid and MIBPA.

The invention is also the curing agent combination of salicylic acid and MIBPA.

DETAILED DESCRIPTION OF THE INVENTION

According to one embodiment of the instant inventive concept, blends of a polyepoxide and a combination of salicylic acid and MIBPA are thoroughly admixed and cured in accordance with conventional methods to provide cured epoxy resins having excellent properties.

In another embodiment of this invention blends of polyepoxide and combination of salicylic acid and MIBPA are thoroughly mixed and placed in a mold where reaction proceeds. This technique is known as Reaction Injection Molding (RIM).

As the data which follows will shown only the particular combination of salicylic acid and MIBPA gives significant increases in glass transition temperature (Tg) as opposed to the amine curative alone. This improvement in Tg is especially important where molded part heat stability is important such as automobile body parts subjected to paint oven baking temperatures.

Generally, the ratio of salicylic acid to MIBPA in the curative combination of this invention can be maximized to the limit of solubility of the amine salts formed.

It has been found that Tg properties increase as the amount of salicylic acid increases.

Generally the vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of gylcidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-,3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The novel curing agent combination of this invention may be used alone or in combination with other curing agent(s).

The cured resins, in accordance with the instant invention, may be prepared in a conventional manner. The resins described herein are especially useful in RIM applications as described above. The curing agent combination of salicylic acid and MIBPA is admixed with the polyepoxide composition in amounts according to the functional equivalent weight of the curing agent employed. Generally the number of equivalents of reactive groups is from about 0.8 to about 1.2 times the number of epoxide equivalents present in the curable epoxy resin composition, with from 0.9 to a stoichiometric amount being preferred. The exact amount of constituents in accordance with the above general requirements will depend primarily on the application for which the cured resin is intended.

The novel curing agent combination is incorporated into the resin by admixing. The constituents forming the curable material are preferably intimately admixed and allowed to react in a mold (e.g. RIM process).

In accordance with a preferred embodiment, a curable resin comprises a diglycidyl ether of 4,4'-isopropylidene bisphenol and an effective amount of the curing agent combination of salicylic acid and MIBPA. According to a greatly preferred embodiment, from about 10 to about 30 parts by weight of curing agent combination is used per 100 parts of resin. Generally, the mixture of epoxy resin and the curing agent combination of salicyclic acid and MIBPA is allowed to cure in a mold at elevated temperatures up to bout 200° C.

It will further be realized that various conveniently employed additives can be admixed with the polyepoxide containing composition of the instant invention prior to final cure. For example, conventional pigments, dyes, fillers, flame retarding agents and the like which are compatible, natural or synthetic resins can be added. Furthermore, known solvents for polyepoxide materials such as toluene, benzene, xylene, dioxane, ethylene glycol monomethylether and the like can be used. The polyepoxide resins of the instant invention can be used in any of the above applications for which polyepoxides are customarily used.

The following examples illustrate the nature of the instant invention but are not intended to be limitative thereof.

EXAMPLE I

Glass Transition Temperature (Tg) with Variable Curative Concentration

A well known epoxy resin was mixed with various mixtures of salicylic acid and MIBPA and mixture was placed in a mold and allowed to react. Various concentrations of curing agent combinations were used as indicated. The glass transition temperatures generally increased as the amount of salicylic acid increased at a constant total curing agent concentration.

| Curing Agent, Tg, °C.: | Curing Agent, Concentration, phr.[1] | | | | | | | | | | | |
|---|---|---|---|---|---|---|---|---|---|---|---|---|
| | 17 | 18 | 19 | 20 | 21 | 22 | 23 | 24 | 26 | 28 | 30 | 32 |
| MIBPA | 97 | — | 97 | — | 97 | — | 85.5 | — | — | — | — | — |
| MIBPA. Salicylic Acid (95:5 pbw) | — | 96 | — | 97.5 | — | 95 | — | 89.5 | — | — | — | — |
| MIBPA. Salicylic Acid (95:10 pbw) | — | 100.5 | — | 102.5 | — | 96.5 | — | 93.5 | — | — | — | — |
| MIBPA. Salicylic Acid (75:25 pbw) | — | 104 | — | 109 | — | 109 | — | 106.5 | 104.5 | — | — | — |
| MIBPA. Salicylic Acid (60:40 pbw) | — | 98 | — | 101.5 | — | 104 | — | 109.5 | 113 | 112.5 | 107.5 | — |
| MIBPA. Salicylic Acid (50:50 pbw) | — | — | — | — | — | — | — | 114.5 | 112.5 | 121 | 124.5 | 123.5 |

[1]Epon ® 828 from Shell, a diglycidyl ether of Bisphenol A was used in all Examples. All samples were cured 3 minutes at 150° C.

EXAMPLE II

| | Properties of RIM Molded Epoxy Resin With MIBPA and MIBPA/Salicylic Acid Blends | | | | | |
|---|---|---|---|---|---|---|
| Curing Agent | Curing Agent Concentration, phr.[2] | | | | | |
| MIBPA | 21 | — | — | — | — | — |
| MIBPA. Salicylic Acid (95:5 pbw) | — | 20 | — | — | — | — |
| MIBPA. Salicylic Acid (90:10 pbw) | — | — | 20 | — | — | — |
| MIBPA. Salicylic Acid (75:25 pbw) | — | — | — | 20 | — | — |
| MIBPA. Salicylic Acid (60:40 pbw) | — | — | — | — | 26 | — |
| MIBPA. Salicylic Acid (50:50 pbw) | — | — | — | — | — | 30 |
| Brookfield viscosity, cps, 25° C. | 500 | 700 | 850 | 2400 | 6500 | 13500 |
| Gel time, mins. (200g. mass) | 29.5 | 16.8 | 11.4 | 6.7 | 4.8 | 5.0 |
| Peak exotherm, °C. | 267.4 | 283.6 | 260.2 | 240.2 | 226.5 | 220.4 |
| Time to peak temperature, mins. | 37.5 | 25.0 | 18.0 | 14.0 | 7.0 | 7.5 |
| Properties of cured ⅛inch castings: | | | | | | |
| Flexural strength, psi. | 13900 | 13200 | 13900 | 15000 | 19100 | 19100 |
| Flexural modulus, psi. | 403000 | 348000 | 362000 | 395000 | 498000 | 493000 |
| HDT*, °C., | | | | | | |

-continued

Properties of RIM Molded Epoxy Resin With MIBPA and MIBPA/Salicylic Acid Blends

| Curing Agent | Curing Agent Concentration, phr.[2] | | | | | |
|---|---|---|---|---|---|---|
| 264 psi/66 psi. | 80/85 | 78/87 | 84/96 | 96/103 | 93/105 | 91/102 |
| Tensile strength, psi. | 7900 | 9300 | 8300 | 9500 | 10800 | — |
| Tensile modulus, psi. | 340000 | 379000 | 334000 | 347000 | 417000 | — |
| Elongation at break, % | 14.1 | 14.2 | 16.7 | 10.1 | 7.5 | — |

Formulations which yielded higher Tg values (those containing higher amounts of salicylic acid) also resulted in improved physical properties, i.e., higher HDT and modulus values, properties that are quite important for RIM-processed moldings.
*Heat Distortion Temperature (ASTM D648)

EXAMPLE III

Glass Transition Temperature (Tg) of RIM Molded Epoxy Resins with Variable Curative Concentration

| | Curative Concentration, phr. | | | | | | | | | | |
|---|---|---|---|---|---|---|---|---|---|---|---|
| | 14 | 16 | 18 | 20 | 22 | 24 | 26 | 28 | 30 | 32 | 34 |
| Tg, °C.: TETA | 122.5 | 128.5 | 120.5 | — | — | — | — | — | — | — | — |
| TETA/Salicylic acid (75:25 pbw) | — | 99.5 | 111.5 | 114.5 | 111.5 | 107.5 | — | — | — | — | — |
| TETA/Salicylic acid (60:40 pbw) | — | — | — | — | — | 83 | 97 | 99.5 | 103 | 106.5 | 104 |
| AEP | — | — | — | 84 | 103 | 109.5 | 106.5 | — | — | — | — |
| AEP/Salicylic acid (75:25 pbw) | — | — | — | — | 90 | 99 | 105.5 | 108.5 | 108.5 | 105 | — |
| AEP/Salicylic acid (60:40 pbw) | — | — | — | — | — | — | 97.5 | 101.5 | 99.5 | — | — |
| BAPP | — | — | — | — | 96.5 | 105.5 | 108.5 | 110 | 103 | — | — |
| BAPP/Salicylic acid (75:25 pbw) | — | — | — | — | — | 96.5 | 103 | 109.5 | 114.5 | 116 | 112 |
| BAPP/Salicylic acid (60:40 pbw) | — | — | — | — | — | — | — | 84 | 117 | 103 | 100 |

Note that with TETA (triethylenetetramine) and AEP (Aminoethylpiperazine), Tg declined with increased salicylic acid content. With BAPP (Bis(aminopropyl)piperazine), only a slight increase in Tg was noted with increased amounts of salicylic acid.

I claim:
1. A reaction injection molded epoxy resin composition which comprises:
   a vicinal polyepoxide having an average of at least 1.8 reactive, 1,2-epoxy groups per molecule and
   an amount of a mixture of salicylic acid and methyliminobispropylamine effective for curing the epoxy resin.
2. An epoxy resin composition as in claim 1 wherein the combination of salicylic acid and methyliminobispropylamine is present in an amount comprising at least 10 parts by weight per 100 parts by weight of epoxy resin.
3. A method for making a reaction injection molded epoxy resin composition wherein the epoxy resin comprises a vicinal polyepoxide having an epoxide equivalency of greater than 1.8 comprising the steps of:
   intimately mixing with said vicinal polyepoxide an effective amount of a combination of salicylic acid and methyliminobispropylamine and allowing the said intimate mixture to react in a mold.
4. A method as in claim 3 wherein the combination of salicylic acid and methyliminobispropylamine is present in an amount comprising at least 10 parts by weight per 100 parts by weight of epoxy resin.
5. A curable resin composition comprising a diglycidyl ether of 4,4'-isopropylidene bisphenol polyepoxide and a curing amount of a combination of salicylic acid and methyliminobispropylamine.
6. A curable resin composition as in claim 7 wherein the combination of salicylic acid and methyliminobispropylamine is present in an amount comprising at least 10 parts by weight per 100 parts by weight of polyepoxide.
7. As a composition of matter an epoxy resin curative combination comprising salicylic acid and methyliminobispropylamine.

* * * * *